US012665432B2

(12) United States Patent
Manikfan et al.

(10) Patent No.: US 12,665,432 B2
(45) Date of Patent: Jun. 23, 2026

(54) METHOD AND SYSTEM FOR THE HIERARCHICAL SCHEDULING OF ENERGY FLOWS IN MICROGRIDS DEPLOYING BATTERY ENERGY STORAGE SYSTEMS

(71) Applicant: Honeywell International Inc., Charlotte, NC (US)

(72) Inventors: Sameer D. Manikfan, Hyderabad (IN); Andrew J. Trenchard, Romsey (GB)

(73) Assignee: Honeywell International Inc., Charlotte, NC (US)

( * ) Notice: Subject to any disclaimer, the term of this patent is extended or adjusted under 35 U.S.C. 154(b) by 383 days.

(21) Appl. No.: 18/229,651

(22) Filed: Aug. 2, 2023

(65) Prior Publication Data
US 2025/0047105 A1     Feb. 6, 2025

(51) Int. Cl.
| | |
|---|---|
| *H02J 3/466* | (2026.01) |
| *G06N 3/08* | (2023.01) |
| *H02J 3/00* | (2026.01) |
| *H02J 13/13* | (2026.01) |
(Continued)

(52) U.S. Cl.
CPC .............. *H02J 3/466* (2020.01); *G06N 3/08* (2013.01); *H02J 3/004* (2020.01); *H02J 13/1321* (2026.01); *H02J 2103/30* (2026.01); *H02J 2103/35* (2026.01)

(58) Field of Classification Search
CPC ...... H02J 3/466; H02J 3/004; H02J 13/00016;
H02J 2203/10; H02J 2203/20; H02J 3/00; H02J 3/003; H02J 3/32; H02J 13/00001; H02J 13/00002; H02J 3/06; H02J 3/0075;
(Continued)

(56) References Cited

U.S. PATENT DOCUMENTS

| | | | |
|---|---|---|---|
| 8,774,641 | B2 | 7/2014 | Ohkawa |
| 9,597,975 | B2 | 3/2017 | Ito et al. |
| 11,164,111 | B2 | 11/2021 | Minegishi et al. |
(Continued)

FOREIGN PATENT DOCUMENTS

WO     2018074973 A1     4/2018

*Primary Examiner* — Ziaul Karim
(74) *Attorney, Agent, or Firm* — Paschall & Associates, LLC; James C. Paschall; Anthony Miologos

(57)     ABSTRACT

The method and system manages energy flows between an electrical grid and a plurality of microgrids that deploy at least one battery energy storage system, and which are controlled by a microgrid controller. A central controller receives electrical grid information from external sources and is arranged to generate an aggregate long-term schedule and an aggregate short-term schedule for energy flows and energy prices for the plurality microgrids connected to the central controller. A microgrid scheduler associated with each microgrid includes a long-term day(s) ahead scheduler that receives the aggregating long-term schedule and a short-term near real-time scheduler that receives the aggregate short-term schedule. The long-term day(s) ahead scheduler is arranged to generate a microgrid long-term schedule that controls energy flows between the electrical grid and each microgrid and its connected battery energy storage system that is corrected by a microgrid short-term near real-time schedule generated by the microgrid short-term near real-time scheduler.

18 Claims, 8 Drawing Sheets

(51) Int. Cl.
    *H02J 103/30*        (2026.01)
    *H02J 103/35*        (2026.01)

(58) Field of Classification Search
    CPC ................. H02J 3/008; H02J 13/00004; H02J
                13/00028; H02J 13/00032; G06N 3/08
    See application file for complete search history.

(56)                References Cited

U.S. PATENT DOCUMENTS

| 2019/0173286 A1* | 6/2019 | Ilic .................. G06Q 10/06315 |
| 2020/0076196 A1* | 3/2020 | Lee ........................ G06Q 50/06 |
| 2021/0358058 A1* | 11/2021 | da Mata Cecilio .... G06Q 50/06 |
| 2022/0009372 A1* | 1/2022 | Bhargava ............... B60L 53/63 |
| 2022/0145730 A1* | 5/2022 | Benson .............. E21B 41/0085 |
| 2022/0247188 A1* | 8/2022 | Manikfan ............ G06Q 30/018 |

* cited by examiner

METHOD AND SYSTEM FOR THE HIERARCHICAL SCHEDULING OF ENERGY FLOWS IN MICROGRIDS DEPLOYING BATTERY ENERGY STORAGE SYSTEMS

TECHNICAL FIELD

This disclosure is generally directed to the control of grid connected microgrids deploying battery energy storage systems. More specifically, it relates to a method and system that uses hierarchical scheduling for controlling energy flows between an electrical grid and a microgrid from battery energy storage systems.

BACKGROUND

Currently, most electric power is generated by large, centralized power plants, such as nuclear powerplants, hydroelectric plants, and fossil fuel powered plants. These large facilities frequently generate power using non-renewable sources of energy, such as coal or gas. Such power plants commonly have good economies of scale, however due to various economic and operational reasons may not provide all of the power required to service the dynamically changing loads of the electrical grid. For example, increased load at certain times of the day and power outages caused by aging centralized power plants due to an imbalance in the supply and demand in the electrical grid and environmental impacts provided by seasonal effects. Battery energy storage systems (BESS) having stored generated power may be connected at a power plant, substation, transmission line or at a customer site to selectively use stored energy to supplement or provide all the power required by the microgrid, thereby preventing service interruptions.

The BESS employs chemical energy storage batteries that chemically store energy such as for example a lithium ion (LiON) batteries, lead acid batteries (Pb), or sodium-sulfur (NAS) batteries. The batteries contained in the BESS are charged using a power conversion system (PCS) attached to the BESS, taking into account the power capacity of the PCS. Power from a PCS to charge the BESS batteries may be from renewable energy sources, such as solar or wind or from non-renewable sources as from diesel generators, or electrical power provided from an electrical grid.

The power and energy capacity of the BESS is determined by the number of battery racks contained in a BESS and put into operation. When there are multiple BESS containers deployed attached to a single or one or more PCS, a controller associated with each BESS may compute a power reference for all the PCSs. Preparation for future peak power demand requires BESS to be fully charged before the time of the peak demand. Charging at high power at an earlier time can cause peaks to simply shift to an earlier time, avoiding grid co-incident peaks. However, shifting may not avoid demand charges that would be incurred when a BESS is charged with same amount of power. Avoiding high demand charges requires not just shifting of BESS charging to a different time, but also spreading the charging over a longer duration that results in reduction in power drawn from the grid sources at any given time. Charging over a longer duration requires scheduling the charging operations in advance so that charging can start ahead of time.

SUMMARY

This disclosure relates to a method and system for the control of microgrids that are connected to an electrical grid and deploying battery energy storage systems.

In a first embodiment a method for managing energy flows between an electrical grid and a plurality of microgrids is disclosed that deploy at least one battery energy storage system controlled by a microgrid controller. The method comprises receiving by a central controller electrical grid information from external sources and generating by the central controller using the electrical grid information an aggregate long-term schedule and an aggregate short-term schedule for energy flows and energy prices for the plurality microgrids connected to the central controller. The method further comprises, receiving by a microgrid scheduler the aggregating long-term schedule and the aggregate short-term scheduler that generates using the aggregating long-term scheduler a microgrid long-term schedule for controlling energy flows between the electrical grid and each microgrid and its connected battery energy storage system, wherein the microgrid long-term schedule is corrected using a microgrid short-term near real-time schedule generated by the microgrid scheduler.

In a second embodiment a system for managing energy flows between an electrical grid and a plurality of microgrids is disclosed each microgrid deploying at least one battery energy storage system and controlled by a microgrid controller. the system comprising, a central controller arranged to receive electrical grid information from external sources and arranged to generate an aggregate a long-term schedule and an aggregate short-term scheduler for energy flows and energy prices for the plurality microgrids connected to the central controller. A microgrid scheduler is associated with each microgrid connected to the central controller the microgrid scheduler including, a long-term day(s) ahead scheduler that receives the aggregating long-term schedule and a short-term near real-time scheduler that receives the aggregate short-term schedule. The long-term day(s) ahead scheduler is arranged to generate a microgrid long-term schedule for controlling energy flows between the electrical grid and each microgrid and its connected battery energy storage system that is corrected by s microgrid short-term near real-time schedule generated by the microgrid short-term near real-time scheduler.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
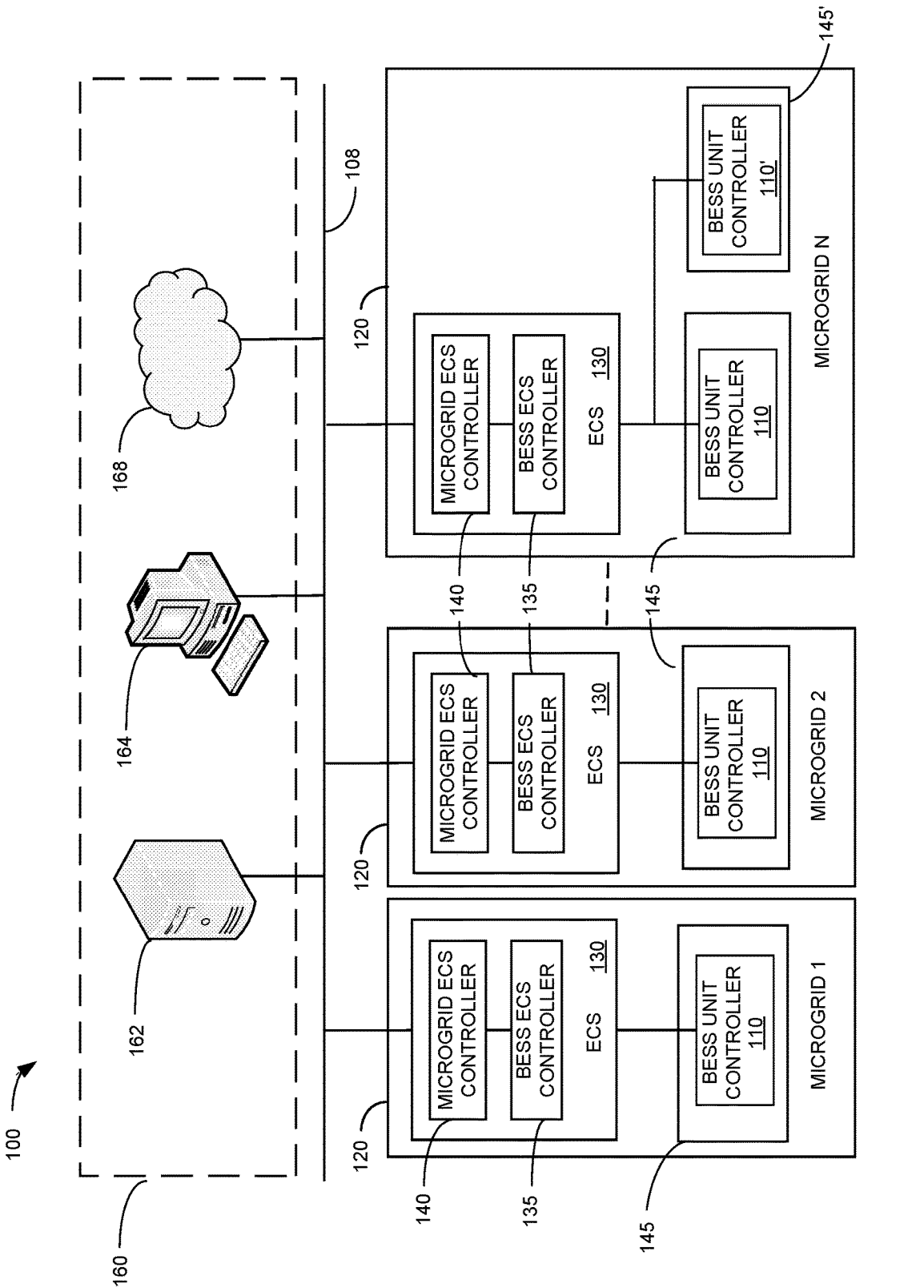
FIG. 1 is a diagram schematically illustrating a hierarchical control system for an aggregation of microgrids connected to an electrical grid and controlled by a virtual power plant controller with each microgrid deploying a battery energy storage system according to an exemplary embodiment of the present disclosure.

FIG. 1 illustrates a hierarchical control system 100 for controlling an aggregation of microgrids that are connected to an electrical grid and controlled by a virtual power plant (VPP) controller, each microgrid deploying one or more battery energy storage systems (BESS) consisting of four hierarchical levels. The system 100 uses hierarchical scheduling for controlling energy flows between the electrical grid and the connected microgrids storing energy into, at certain times and dispatching stored energy from the battery energy storage systems at a various times. At the first level, a BESS unit controller 110 is located in a BESS container 145. The BESS unit controller 110 is used to control the functions of a BESS container 145 and its power conversion system (PCS). Each BESS container 145 is organized as a self-contained package that may include at least a power conversion system, a battery system, a heating ventilation, and air conditioning (HVAC) system, fire protection systems and components and sensors required to monitor the BESS container 145. Each BESS container 145 can be used to power stand-alone deployments of the BESS such as for example, a building or a business enterprise or microgrid deployments of single or multiple BESS containers 145 provide power to a neighborhood of homes or to a business district.

At the second level of the hierarchical control system 100, an energy control system (ECS) 130 is communicatively coupled to one or more BESS unit controllers 110, 110'. The ECS 130 includes an ECS controller 135 that controls the operation of one or more BESS containers 145. The ECS 130 may be connected to a single stand-alone BESS container 145, multiple BESS container 145 deployments or to grid connected microgrids 120 with multi-container BESS deployments. For example, in FIG. 1, the ECS 130 is shown connected to both BESS unit controller 110, as well as BESS unit controller 110' of BESS container 145' via a communication line 109.

The BESS unit controller 110, 110' is tasked to provide for the safe and reliable operation of a BESS container 145. The BESS unit controller 110 monitors the operation of a BESS container 145 preventing operations during fault conditions, shutting down a faulty subsystem and/or sending notifications and alarms to operator station 164 or to mobile device 240. Alarms may be sent using different priority levels if a component, sensor, or subsystem of the BESS container 145 fails or becomes faulty. The BESS unit controller 110 interfaces with all the subsystems within a container such as for example, a power conversion system, battery system, HVAC subsystems, fire protection systems, etc. The major components of the BESS container 145 includes the BESS unit controller 110, battery racks housed within the BESS container 145, and a power container housing a PCS on a separate transportable skid (not shown).

Figure 2:
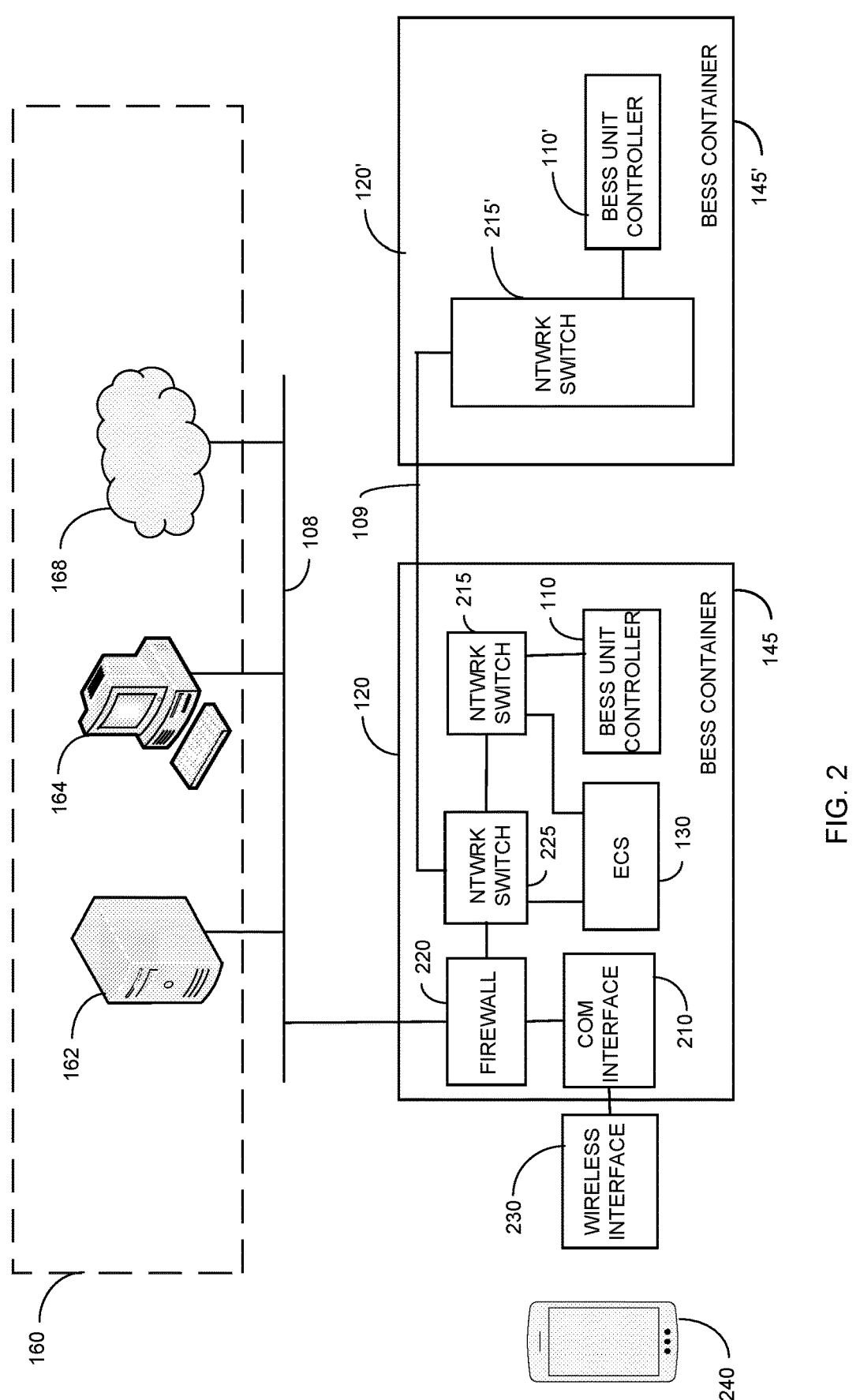
FIG. 2 is diagram schematically illustrating the communication networks and features of the battery energy storage system according to an exemplary embodiment of the present disclosure.

FIG. 2, schematically illustrates the communication features of the BESS container 145. Each BESS container 145 includes communication interfaces that operate using for example an Ethernet communication protocol to communicate between the various components of BESS container 145 and to other BESS containers communicatively coupled to each other in multi-container deployments as for example, between BESS container 145 and 145'. Each microgrid 120 connects to the VPP 160 and to server 162, operator station 164 and cloud 168 via network switch 225, firewall 220, and network 108. Communication between the BESS container 145 and VPP 160 is based on either MQ Telemetry Transport (MQTT), or Distributed Network (DNP3) protocols as used in supervisory control and data acquisition (SCADA) and remote monitoring systems. Network switching devices 215 contained in the BESS container 145 distribute control and data signals between the components of the BESS container 145 and to other interconnected BESS containers, such as for example BESS container 145'. For example, network switch 215' located in BESS container 145' may receive control and data signal from the ECS 130 contained in microgrid 120. The network switch 225 distributes the control and data signals from ECS 130 to BESS unit controller 110' via network switch 215' using communication network 109. The BESS container 145 may also include a communication interface 210 that may connect to a wireless interface 230 allowing communication with the BESS unit controller 110 using a handheld mobile device 240. The handheld mobile device 240 can be used to configure operating parameters of the BESS container 145, and/or retrieve operating data, fault conditions and/or alarms and warnings from the BESS unit controller 110. The BESS container 145 may also include other forms of communication interfaces such as, for example, serial digital and analog I/O communication interfaces, which allow the BESS unit controller 110 to communicate and control BESS container 145 subsystems.

With renewed reference to FIG. 1, a MECS controller 140 is communicatively coupled to the ECS controller 135. The MECS controller 140 comprises the third level of the BESS control system 100. The MECS controller 140 manages alternate power generation assets such as for example, solar, wind, hydroelectric power that may be connected and available on the grid for use by the BESS container 145. The MECS controller 140 is arranged to control and manage the use of alternate power sources to either a stand-alone BESS container 145 deployment or to multiple microgrid connected BESS container deployments.

The ECS controller 135 communicates the state of a fleet of BESS containers 145 to the MECS controller 140. The ECS controller 135 also communicates the power reference for the PCS to the BESS unit controller 110, 110", within a BESS container 145. The MECS controller 140 receives schedules generated autonomously by the VPP controller 160 located in a remote operation center. The schedules may include: a schedule for exchange of power between a microgrid and the electrical grid: a schedule of the price of electricity that may be associated with the import and export of power between a microgrid and the electrical grid; and a schedule of use cases where BESS containers along with generation assets and loads are to be committed. For example, renewable smoothing for export between 09:00 and 12:00 hours of a day, frequency regulation support between 12:00 and 17:00 hours and grid peak demand support between 17:00 and 20:00 hours, etc.

The MECS controller 140 computes a schedule for charging or discharging one or more BESS containers 145 taking into account, schedules for grid power exchange received from the VPP 160, and the local power generation and loads within a microgrid. The construction of a schedule by the MECS controller 140 involves look ahead operations, to forecast local generation and demand/loads. When power generation is controllable, such as when using diesel generators for example, the forecast would be a committed schedule for power from the controllable generators. When power generation is not controllable and intermittent in nature, such as from renewable generators, a forecast is constructed using historic time series data as well as inputs from weather stations and other sources of weather forecasting. Such computed forecasts are subject to uncertainties, especially at the end of the forecast period. This can lead to predicted versus actual deviations that need to be accounted for by computing a revised schedule for charging or discharging the batteries of a BESS container 145.

The MECS controller 140 uses a short-term battery charging/discharging forecast when computing a look ahead schedule because charging/discharging of batteries requires a finite amount of time that depends on the charging or C-Rating of the batteries. For example, it takes 1 hour to fully charge a 1 C rated system while it takes 4 hours to fully charge or discharge a 0.25° C. rated system. Hence for a 0.25 C rated system, in order to meet a grid peak support use case at any given time, battery charging should have started at least four hours before the time at which battery is intended to be discharged. Even for a 1C rated system, where it is feasible to charge with high power, charging with a higher power may attract higher demand charges, or alternatively may cause a larger rise in battery temperature that can cause it to degrade faster. A lower charging power would mean charging for a longer duration and a forecast for at least that duration is necessary to ensure that the BESS battery is charged when it is required to dispatch its stored energy.

The MECS controller 140 is also tasked to compute a forecast of power demand within the microgrid from the connected controllable loads. The schedule for power demand is subject to temporal or production constraints, e.g., such as HVAC load and also uncontrollable loads, where there can be deviations in power demand from the forecasted demand. When there are deviations in either generation or demand or both from the forecasted generation or demand a revised schedule need to be computed, that considers the deviations and the current state.

The VPP 160 comprises the fourth level of the BESS control system 100. A software operating program executed on, for example a server 162, functions as a central controller that controls the functions of the VPP 160. The VPP 160 further includes an operator station 164 and an interface to the cloud 168. The server 162 may be any device that provides resources, data, services or software programs to other processing devices or clients over a communication network. The operator station 164 may be any computing device that provides functions for power plant operations and monitoring including display of graphics such as diagrams, systems, BESS container 145 deployments and data to a user or operator. The operator station 164 may also receive input from the user or operator to adjust or enter configurable parameters for a BESS unit controller 110, BESS ECS controller 135 and/or a MECS controller 140. The cloud 168 may be any computing device or technology that delivers services through the internet, including information, data storage, servers, access to databases, networking, and software. The VPP 160 can control multiple BESS containers 145 connected to the VPP 160 through a communication network 108. The VPP 160 as shown in FIG. 1 controls BESS containers 145, 145' in multi microgrid 120 deployments such as the microgrid 1, microgrid 2 and microgrid N, illustrated in FIG. 1.

Figure 3:
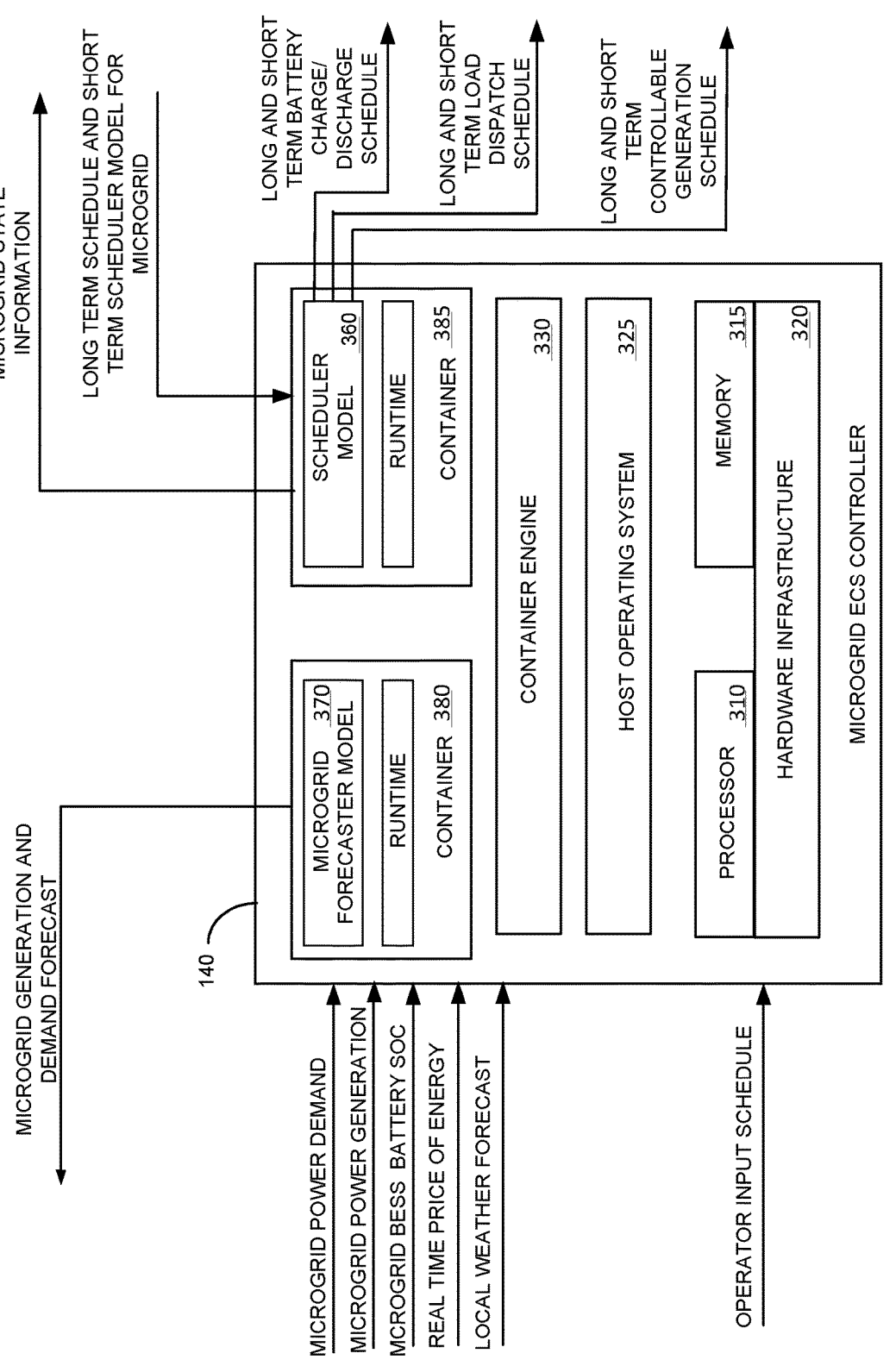
FIG. 3 is diagram schematically illustrating a microgrid ECS controller according to an exemplary embodiment of the present disclosure.

An exemplary schematic of the MECS controller 140 of the ECS 130 is illustrated in FIG. 3. The MECS controller 140 comprises a computer processor 310, a memory 315 and a hardware infrastructure 320. The hardware infrastructure 320 provides I/O and network circuitry for communicatively connecting the MECS controller 140 to the VPP controller 160 and the power generation, operator inputs and battery storage systems of its associated BESS. The processor 310 executes host operating system software 325 used in running the MECS controller. The memory 315 can be any manner of known memory devices for storing data, the host operating system and other application software that provides specialized functions, such as for example application level virtualization software that allows a container engine 330 to execute a microgrid forecaster model 370 and scheduler model 360 as a runtime application in separate computing containers 380, 385.

Each MECS controller 140 generates a forecast for local demand and local power generation for its associated microgrid based on inputs from the microgrid. The inputs include for example, the instantaneous microgrid power demand, the microgrid power generation capacity, the battery state of charge (SOC) from the BESS battery storage systems connected to the microgrid, the real time price local to the microgrid, and the local weather station data at the microgrid site served by the MECS controller 140. The MECS 140 uses the microgrid inputs to generate a demand forecast for the local power demand for the microgrid controlled by the ECS 130. The MECS controller 140 communicates the state of a microgrid to the server 162, where an operator using operator station 164 performs manual scheduling using a Human Machine Interface. Alternatively, the VPP controller 160 operating in server 162 may generate a schedule for grid power exchange autonomously for the different microgrids that are controlled by the server 162 or VPP controller 160.

Figure 4:
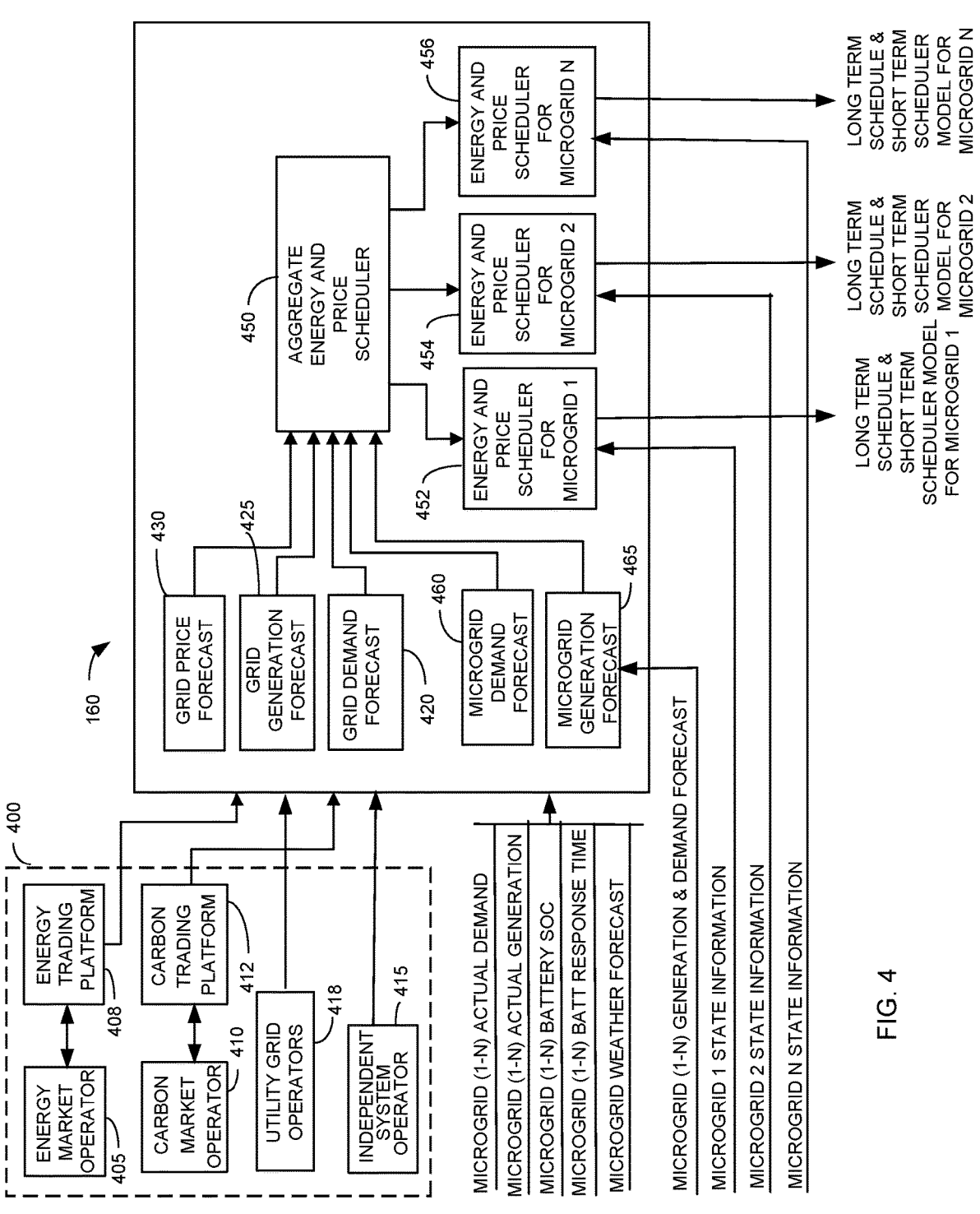
FIG. 4 is diagram schematically illustrating the VPP controller according to an exemplary embodiment of the present disclosure.

FIG. 4 illustrates an exemplary schematic representation of the VPP controller 160. The VPP controller 160 autonomously computes a VPP schedule for grid power exchange for all the microgrids connected to the VPP controller 160 by utilizing state information received from each of the MECS controllers 140. The VPP schedule involves look ahead operations that require use of forecasts for power availability from renewable energy generation sources located within the microgrids and also other energy generation sources that provide their energy to the grid but are located outside of the microgrids. The VPP schedule also uses forecasts of the grid power demand, when computing the VPP schedule. The VPP controller 160 is also configured to receive information from external sources such as for example, energy costs from an energy trading platform, to consider the cost of the purchase of energy and revenue of the sale of energy in the computation of the grid power exchange schedule.

The VPP schedule computed by the VPP controller 160 is an aggregated schedule for all of the microgrids connected to the VPP 160. VPP controller 160 using the information received from external sources 400 generates a grid demand forecast 420, a grid generation forecast 425 and a grid price forecast 430, from historical data provided to the VPP controller 160 from utility grid operators 418, independent system operators (ISO) 415, energy trading platforms 408 or energy market operators 405, carbon trading platforms 412 or carbon market operators 410. For example, an energy market operator 405 may receive information for clearing prices for the local electrical grid from an energy trading platform 408 and provide a real-time selling price, the real-time buying price, and a forecast of the selling price and buying price for power supplied by the electrical to the trading platform 408 where it traded among the users of the electrical grid to purchase or sell electrical energy. A carbon market operator 410 may receive carbon bid prices and carbon clearing prices providing carbon price demands for the electrical grid from a carbon trading platform 412.

The VPP controller 160 also generates a microgrid demand forecast 460 and a microgrid generation forecast 465 using information provided by each microgrid connected to the VPP controller 160. The microgrid demand forecast 460 uses microgrid information provided by each MECS controller 140 and may include the actual demand of the loads in each microgrid, the power generation capability of each microgrid, the current state of charge (SOC) of the BESS supporting each microgrid, the capacity and the response time of the BESS supporting each microgrid and a weather forecast for the location of the microgrid. The BESS response times vary from microgrid to microgrid depending on the SOC of the BESS batteries and their availability to provide power. The microgrid generation forecast 465 receives the forecast of generation and demand developed by the microgrid forecaster model 370) of each MECS controller 140 from each microgrid connected to VPP controller 160.

The VPP 160 controller generates a schedule using the aggregate energy and price scheduler 450 for energy flows and energy price for an aggregation of the microgrids connected to the VPP 160 controller using the data from the grid forecasts, 420, 425 and 430 and the microgrid forecasts 460, 465. The VPP controller 160 considers the cost of energy imported from external centralized generation sources available at different times of the day and at times when power demand and energy costs from the centralized generation is high, thereby allowing the VPP controller 160 to provide a price schedule for sharing of energy between microgrids by generating a local price schedule for selling energy and buying energy for the microgrids. The price schedule is computed such that it enables each microgrid to sell excess generation or stored energy at a higher price, buy energy when prices are low, or curtail loads and use stored energy from a BESS when loads are not interruptible. The price schedule also enables storage of excess generation at BESS for sales at higher prices at a later time instead of curtailing generation.

The aggregate schedule developed by the aggregate energy and price scheduler 450 is used to generate schedules for grid power exchange and power and energy price for each individual microgrid connected to the VPP 160 controller. The aggregate energy and price schedule from scheduler 450 is input to individual energy and price schedulers 452, 454, 456 for the microgrid. Each microgrid energy and price scheduler 452, 454, 456 also receives microgrid state information from its associated MECS controller 140) from a MECS controller scheduler model 360. Each energy and price scheduler 452, 454 and 456 uses the microgrid state information and the aggregate energy and price schedule to develop a long-term schedule and a short-term scheduler model for each microgrid connected to the VPP controller 160.

The aggregate schedule for multiple microgrids developed by the aggregate energy and price scheduler 450 is used to generate schedules for grid power exchange, power, and energy price for individual microgrids that are controlled by the VPP. The aggregate schedule is input to the energy and price schedulers 452, 454, 456 for each microgrid and includes a long-term scheduler and a short-term scheduler for each individual microgrid. The long-term schedule for energy and price is downloaded to the scheduler model 360 of each MECS controller 140 associated with a microgrid. The MECS Controller 140 runs time series forecast models to generate forecasts for local generation and demand using the microgrid forecaster model 370). The MECS controller 140 also runs a scheduler model 360 for generating a short-term near real-time schedule for scheduling power flows between microgrid and the main electrical grid. The short-term scheduler model is trained using the data generated from its respective microgrid short-term schedule from the VPP controller 160. The trained scheduler model is then downloaded from the cloud, from each individual energy and price scheduler 452, 454 and 456 to its associated MECS controller 140).

Figure 5:
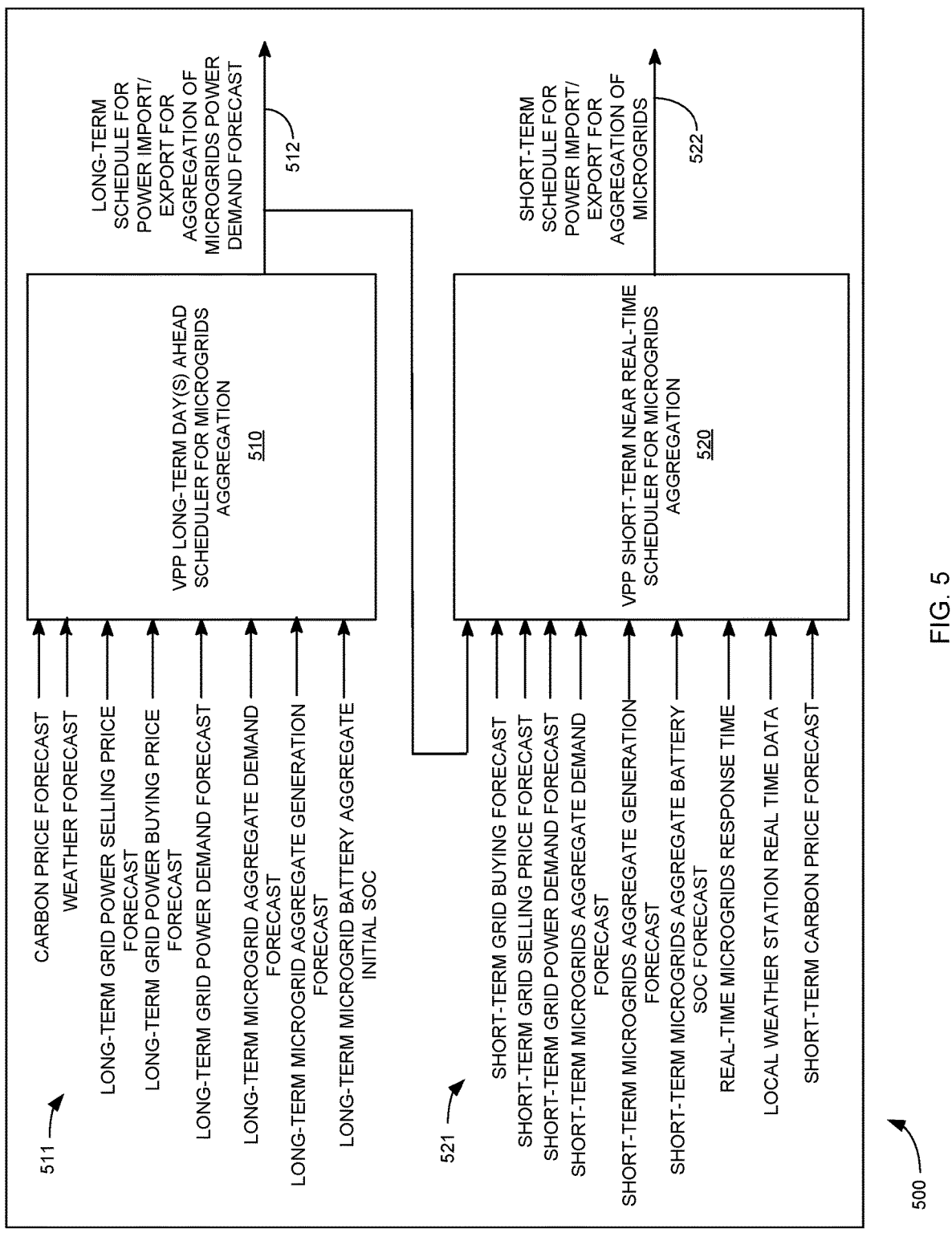
FIG. 5 is a diagram schematically illustrating the scheduler for microgrid aggregation according to an exemplary embodiment of the present disclosure.

FIG. 5 schematically illustrates an example VPP scheduler 500. The VPP scheduler comprises a long-term day ahead or a long-term days ahead scheduler. It will be well understood by those skilled in the art that the scheduler can be configured to develop schedules that are more than one day ahead. The long-term day(s) ahead scheduler 510 and a VPP short-term near real-time scheduler 520 executing in the energy price scheduler 450 of VPP controller 160. The VPP long-term day(s) ahead scheduler 510 generates an intra-VPP microgrids' energy buying and selling schedule, which takes into consideration the microgrids' demand and generation forecasts. Inputs 511 to the VPP long-term day(s) ahead scheduler 510 include long-term electrical grid power, selling, buying and demand forecasts provided by the grid forecasts 420, 425 and 430 as well as aggregated demand, generation, and an aggregated initial battery systems state of charge forecasts from microgrid demand and generation forecasts 460, 465.

The output 512 of the VPP long-term day(s) ahead scheduler 510 is a long-term schedule power demand forecast 512 that is output from the long-term scheduler 510 and also applied as an input to a VPP short-term near real-time scheduler 520, along with inputs 521 for the short-term forecasts of grid price, buying, selling and microgrid, demand, generation. The VPP short-term inputs 521 consider the real-time response times of the BESS battery state of charge as well as forecast of energy availability based on battery cycles scheduled when generating a short-term schedule for power import or export for the aggregation of microgrids 522. The short-term real-time scheduler inputs 521 make corrections to the long-term schedule generated by the VPP long-term scheduler 510 for any inaccuracies that are due to uncertainties in the forecasts generated for weather, grid power buying and selling price, grid power demand, carbon price as well as aggregate power demand and generation from microgrids. The VPP short-term near real-time scheduler 520 outputs a short-term schedule 522 for power import/export for the aggregation of microgrids that is input to each microgrid energy and price scheduler 452, 454, 456.

Figure 6:
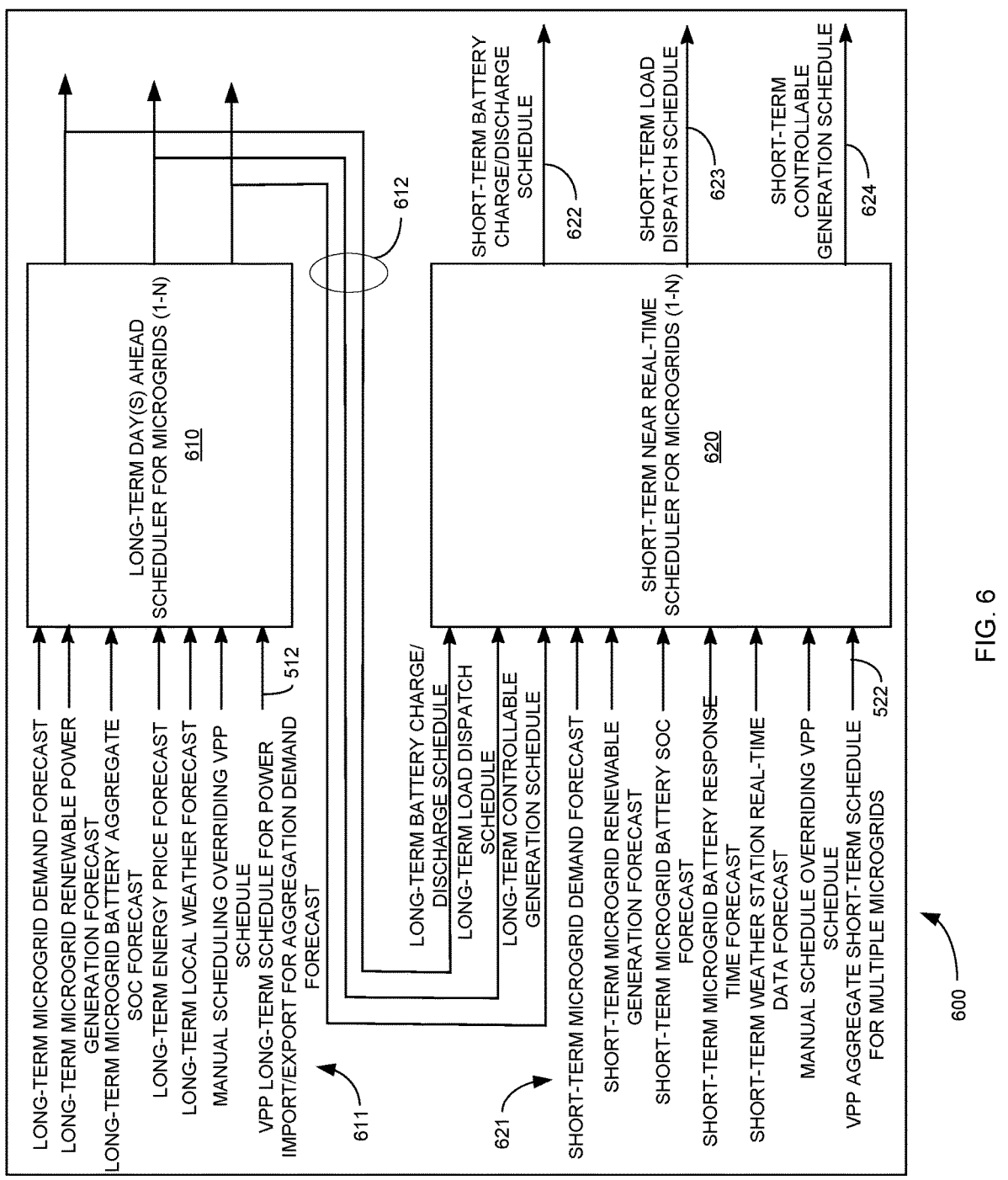
FIG. 6 is a diagram schematically illustrating the scheduler for generating scheduler models for microgrids according to an exemplary embodiment of the present disclosure.

FIG. 6 schematically illustrates an example of the microgrid scheduler 600. The microgrid scheduler 600 is comprised of a long-term day(s) ahead scheduler 610 and short-term near real-time scheduler 620. Each microgrid scheduler 600 executes within an individual energy and price scheduler 452, 454 and 456 associated with microgrid 1, microgrid 2 and microgrid N, respectively. Inputs 611 to the long-term day(s) ahead scheduler 610 includes at least, a long-term microgrid demand and power generation forecast, a long-term energy price forecast, local weather forecast, and the long-term schedule power demand forecast output 512 from the VPP long-term scheduler 510. The long-term day(s) ahead scheduler 610 outputs schedules 612 consisting of a long-term battery charge/discharge schedule, a long term load dispatch schedule and a long-term controllable generation schedule. The schedule outputs 612 are also applied as inputs to the short term near real-time scheduler 620 along with short term forecast inputs 621. Inputs 621 provides short-term microgrid demand, generation, and battery state of charge forecasts. Inputs 621 also include short-term weather station and real-time data and a real-time response time forecast for the BESS battery state of charge.

The short-term real-time scheduler 620 makes corrections to the long-term schedule generated by the microgrid long-term day(s) ahead scheduler 610 for any inaccuracies that are due to uncertainties in the forecasts generated for weather, grid generation, load dispatch and battery charge/discharge. The microgrid short-term real-time scheduler 620 generates a short-term battery charge/discharge schedule 622, a short-term load dispatch schedule 623 and a short-term controllable generation schedule 624 that is output from MECS controller 140 associated with each microgrid energy and price scheduler 452, 454, 456.

The hierarchical scheduling, of the present disclosure uses the higher level scheduling of the VPP long-term and short-term scheduler 500 for the aggregation of microgrids to minimize grid power imports by enabling sharing of energy between microgrids controlled by the VPP. It is also tasked to minimize the cost of grid power import and maximize the revenue from the sale of energy from the VPP to external energy trading partners.

The long-term days(s) ahead scheduler 610 of each microgrid energy and price scheduler 452, 454, 456 has an objective to minimize the cost of energy for individual microgrids while meeting the constraints that the VPP controller 160 has on meeting the external grid power import and export.

Figure 7:
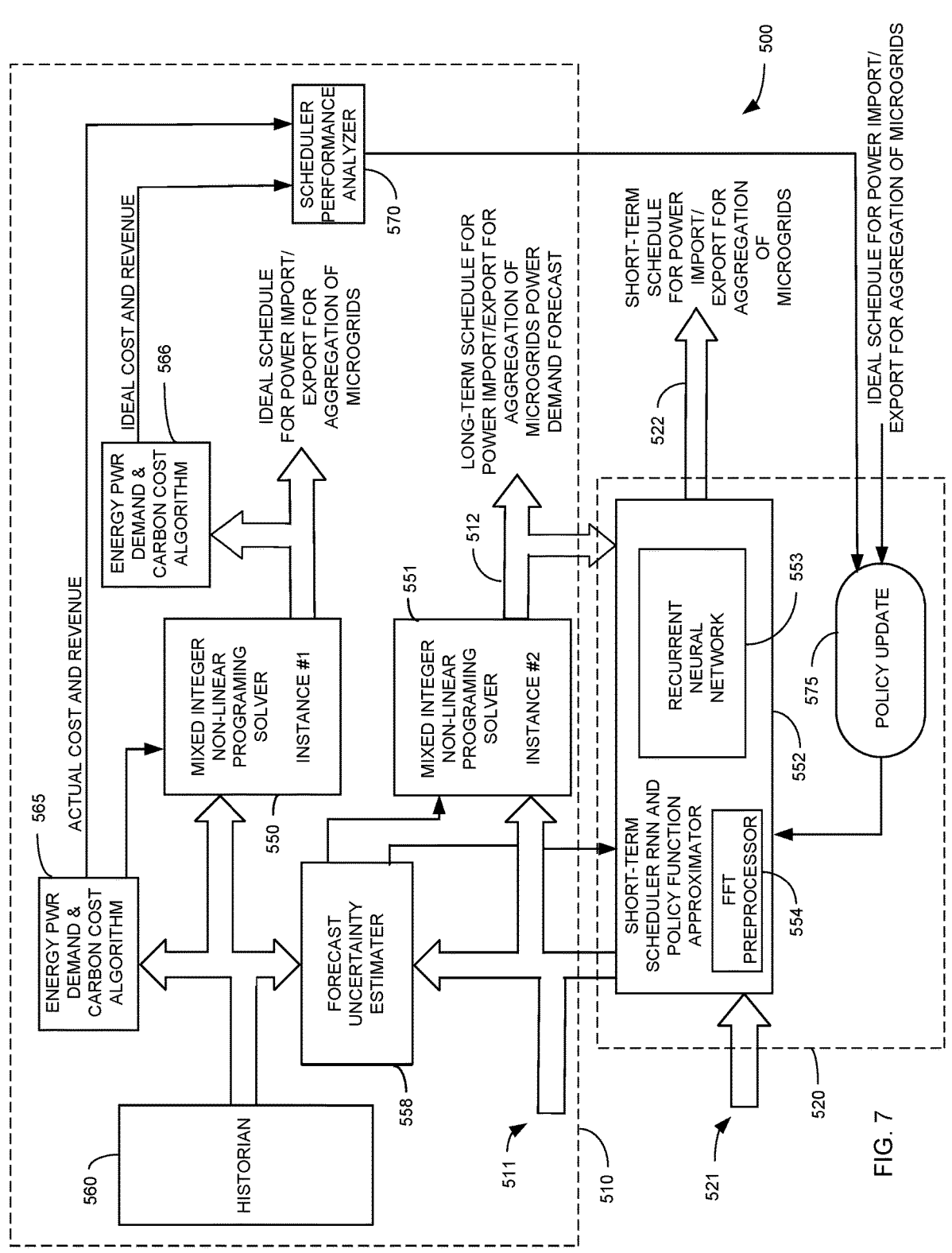
FIG. 7 is a diagram schematically illustrating the functional elements of the scheduler of FIG. 5 according to an exemplary embodiment of the present disclosure.

FIG. 7 schematically illustrates an example of the functional operational elements of the VPP scheduler 500 for generating the long-term schedule 512 and the short-term schedule 522 for the aggregation of microgrids. The long-term day(s) ahead scheduler 510 uses a second instance of a mixed integer non-linear programming (MINLP) solver 551 to generate the long-term schedule 512. The first instance of an MINLP solver 550 receives and uses the long-term input data 511 listed in FIG. 5 with long-term forecasted generation and demand data, price costs on the electrical grid, and the aggregation of microgrids as constraints that provides an optimization objective to minimize costs in the purchase of energy and maximize revenue from the sale of energy. The generated long-term schedule 512 is typically a day ahead schedule but could extend over a longer time horizon depending on the energy market mechanisms. A forecast uncertainty estimator 558 estimates a measure of uncertainty in the forecast by measuring the difference between past day ahead forecasts and past actual generation demands provided by historian 560 with the current prices of energy. The estimated uncertainty is taken into account in MINLP 551 when generating the long-term schedule 512 for the aggregation of microgrids.

The long-term schedule 512 is generated once per day. Delays in computing the long-term schedule 512 does not significantly impact the operation of aggregation of microgrids. In order to minimize the latency in generating the short-term schedules, a neural network scheduler 552 having a recurrent neural network (RNN) model 553 and a fast Fourier transform (FFT) preprocessor 554, is used to learn and mimic the operations of the MINLP solver 551. The performance of the neural network scheduler 552 is continuously measured by computing the total cost of energy based on the scheduled grid interchange power flows between an aggregation of microgrids and the electrical grid. The cost is computed based on the schedule generated by the RNN model 553 and compared with the total cost associated with an ideal schedule generated by a first instance of an MINLP solver 550. A scheduler performance analyzer 570 receives an actual cost and revenue input from an energy power demand and carbon costs algorithm 565 and an ideal cost and revenue generated by a second energy power demand and carbon costs algorithm 566 that receives the ideal schedule from the MINLP solver 550. The scheduler performance analyzer 570) uses the actual and ideal cost and revenue inputs to generate a value that is a function of the difference between the total cost associated with an actual short-term schedule generated by the neural network scheduler 552 of scheduler 520 and the ideal schedule generated by the MINLP solver 550 with data from the historian 560. The value from the scheduler performance analyzer 570 is fed back into a policy updating algorithm 575 that continuously updates the RNN 553 implementing the policy function for the VPP short-term near real-time scheduler 520.

Figure 8:
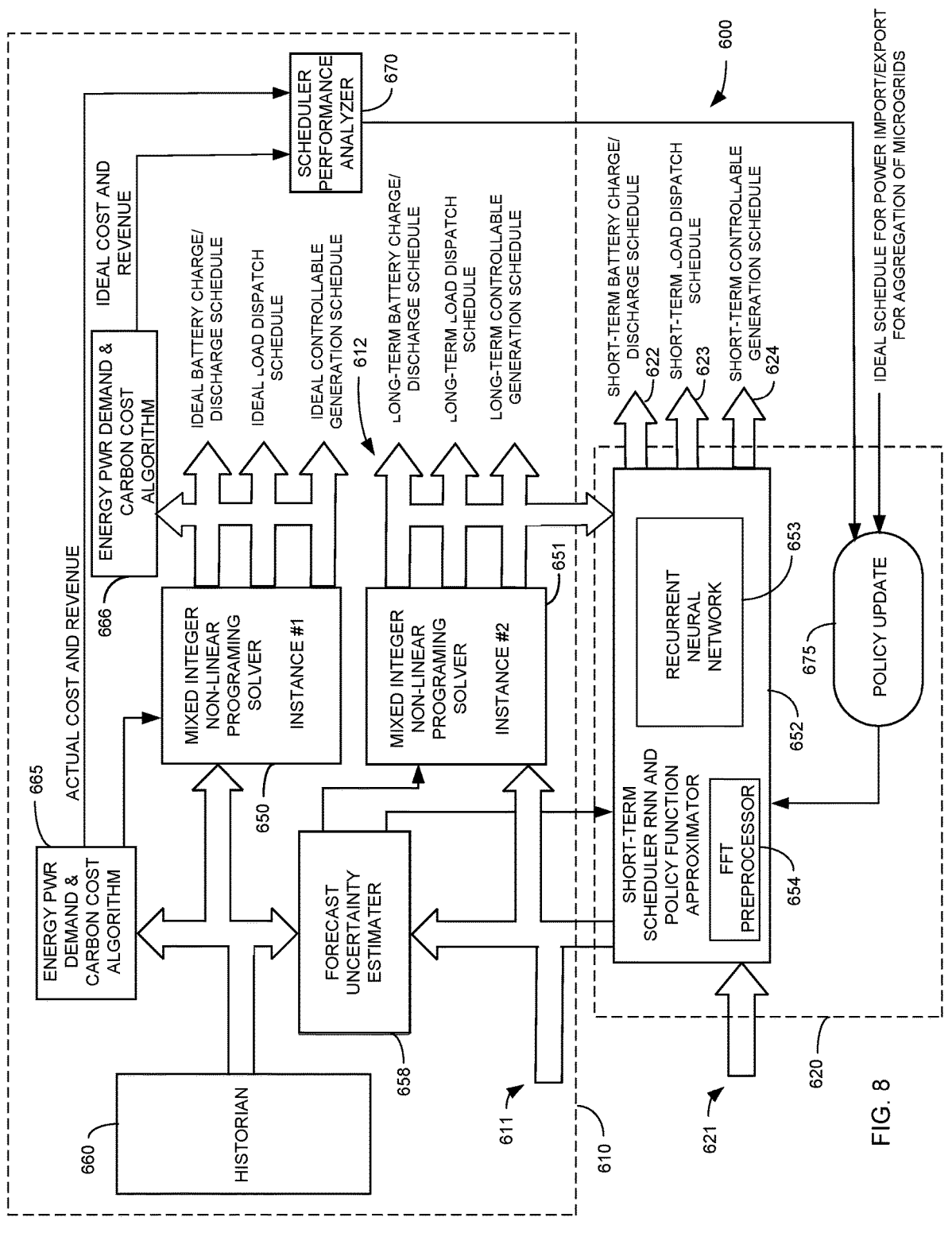
FIG. 8 is a diagram schematically illustrating the functional elements of the scheduler of FIG. 6 according to an exemplary embodiment of the present disclosure.

FIG. 8 schematically illustrates an example of the functional operational elements of the microgrid scheduler 600 for generating long-term schedules 612 and the short-term schedules 622, 623, 624 for individual microgrids. The long-term day(s) ahead scheduler 610 uses a second instance mixed integer non-linear programming (MINLP) solver 651 to generate the long-term schedules 612 for battery energy storage & dispatch, power generation from controllable generators and controllable loads. The MINLP solver 651 receives and uses the long-term input data 611 listed in FIG. 6, and demand and intra-VPP energy prices and forecasts as well as manual schedules as constraints with an optimization objective to minimize the total cost of operations, including battery lifecycle costs and maximize the revenue from the sale of energy.

The long-term schedules 612 generated for the individual microgrids is typically a day ahead schedule but could extend over a slightly longer time horizon depending on the energy market mechanisms. A forecast uncertainty estimator 658 estimates the uncertainty in the forecast by measuring the difference between past forecasts and past actual generation, provided by a historian 660 with demand and prices of energy. This uncertainty is considered by the second instance of MINLP solver 651 when generating the long-term schedules 612 for the individual microgrids. As the long-term schedule is generated once per day, delays in computing the schedule for battery energy storage & dispatch, power generation from controllable generators and controllable loads do not significantly impact the operation of the microgrids. However, the generation of the short-term near real-time schedules 622, 623 624 come with latency constraints. Delays in computing the short-term near real-time schedules 622, 623 624 can potentially affect the microgrids operations.

In order to minimize the latency in generating the short-term schedules, a neural network scheduler 652 having a recurrent neural network (RNN) model 653 and a fast Fourier transform (FFT) preprocessor 654, is used to learn and mimic the operations of the first instance MINLP solver 650. The performance of the neural network scheduler 652 is continuously measured by computing the total cost of energy based on the scheduled controllable generation. load dispatch and battery charge/discharge. The cost is computed based on the schedule generated by the RNN model 653 and compared with the total cost associated with an ideal schedule generated by the first instance MINLP solver 650. A scheduler performance analyzer 670 receives an actual cost and revenue input from an energy power demand and carbon costs algorithm 665 and an ideal cost and revenue generated by a second energy power demand and carbon costs algorithm 666 that receives the ideal schedule from the MINLP solver 650. The scheduler performance analyzer 670 uses the actual and ideal cost and revenue inputs to generate a value that is a function of the difference between the total cost associated with an actual short-term schedule generated by the RNN 652 of scheduler 620 and the ideal schedule generated by the first instance MINLP solver 650 with data from the historian 560. The performance analyzer 670 includes an anomaly detection algorithm to identify cases where a performance difference is due to exceptional reasons that should not be used to update the RNN 653 model policy. For normal cases, the value from the scheduler performance analyzer 670 is fed back into a policy updating algorithm 675 that continuously updates the RNN 653 implementing the policy function for the short-term near real-time scheduler 620.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for managing energy flows between an electrical grid and a plurality of microgrids each microgrid deploying at least one battery energy storage system and controlled by a microgrid controller, the method comprising:

receiving by a central controller electrical grid information from external sources, wherein the central controller comprises a virtual power plant (VPP) controller;

generating by the VPP controller using the electrical grid information an aggregate long-term schedule and an aggregate short-term schedule for energy flows and energy prices for the plurality of microgrids connected to the VPP controller, wherein the aggregate long-term schedule comprises at least a day-ahead plan, over a long-term scheduling horizon, defining at least grid power exchange, and power and energy pricing for each of the plurality of microgrids connected to the VPP controller, wherein the aggregate short-term schedule comprises a near real-time plan, over a short-term scheduling horizon shorter than the long-term scheduling horizon, defining updated power import and updated power export for the plurality of microgrids;

generating and training, by the VPP controller, a microgrid controller scheduler model for power import and export for the plurality of microgrids connected to the VPP controller;

receiving by a microgrid scheduler associated with each microgrid, the aggregate long-term schedule and the aggregate short-term schedule;

generating by each microgrid scheduler using the aggregate long-term schedule, a microgrid long-term schedule for controlling energy flows between the electrical grid and each microgrid and its connected battery energy storage system; and correcting, by the microgrid scheduler, microgrid long-term schedule using a microgrid short-term near real-time schedule comprising an updated near real-time schedule generated at a higher update frequency than the microgrid long-term schedule to compensate for forecast uncertainties.

2. The method of claim 1, wherein the method further comprises:

training a microgrid controller scheduler model at the central controller; and downloading the microgrid controller scheduler model to each microgrid controller.

3. The method of claim 1, wherein the microgrid long-term schedule of each microgrid scheduler for controlling energy flows comprises:

generating a long-term battery energy storage system charge/discharge schedule;

generating a long-term load dispatch schedule; and generating a long-term controllable generation schedule.

4. The method of claim 1, wherein the microgrid short-term near real-time schedule corrects the microgrid long-term schedule for the effects of uncertainties in microgrid long-term forecasts.

5. The method of claim 4, wherein the method further comprises:

correcting the microgrid long-term schedule using a microgrid short-term near real-time schedule for the effects of uncertainties in the microgrid long-term forecasts using short-term forecasts including at least:

power generated from renewable generators;

the battery energy storage system state of charge;

response times of the power generated by the renewable generators and the battery energy storage system; and manually entered long-term schedules.

6. The method of claim 5, wherein the microgrid long-term schedule is continuously updated by the microgrid short-term near real-time scheduler based on the short-term forecasts.

7. The method of claim 6, wherein the microgrid short-term near-real time schedule is compared to a schedule generated by a mixed integer non-linear programming (MINLP) solver using data from a historian.

8. The method of claim 7, wherein the method further comprises:

improving the microgrid scheduler by analyzing the performance difference between the microgrid short-term near real time schedule and the schedule to generate a value used for improving the microgrid scheduler.

9. The method of claim 8, wherein the method further comprises:

downloading the improved microgrid scheduler to the microgrid controller, wherein the microgrid controller is used to control the energy flows between the electrical grid and the microgrids for storing energy in the microgrid battery energy storage system and that dispatches energy from the microgrid battery energy storage system to the electrical grid and microgrid.

10. A system for managing energy flows between an electrical grid and a plurality of microgrids each microgrid deploying at least one battery energy storage system and controlled by a microgrid controller, the system comprising:

a central controller comprising a virtual power plant (VPP) controller, the VPP controller arranged to receive electrical grid information from external sources and arranged to generate an aggregate long-term schedule and an aggregate short-term schedule for energy flows and energy prices for the plurality microgrids connected to the VPP controller;

wherein the aggregate long-term schedule comprises at least a day-ahead plan, over a long-term scheduling horizon, defining at least grid power exchange, and power and energy pricing for each of the plurality of microgrids connected to the VPP controller, wherein the aggregate short-term schedule comprises a near real-time plan, over a short-term scheduling horizon shorter than the long-term scheduling horizon, defining updated power import and updated power export for the plurality of microgrids;

wherein the VPP controller comprises:

a VPP long-term scheduler configured to generate the aggregate long-term schedule for the energy flows and energy price for the plurality of microgrids connected to the VPP;

a VPP short-term scheduler configured to generate the aggregate short-term schedule for power import and export for the plurality of microgrids connected to the VPP controller; and a microgrid scheduler associated with each microgrid connected to the VPP controller, each microgrid scheduler comprising:

a long-term day(s)-ahead scheduler configured to receive the aggregate long-term schedule and to generate a microgrid long-term schedule for controlling energy flows between the electrical grid and each microgrid and its connected battery energy storage system; and a short-term near real-time scheduler configured to receive the aggregate short-term near real-time schedule and to correct microgrid long-term schedule using a microgrid short-term near real-time schedule, wherein the microgrid short-term near real-time schedule comprising an updated near real-time schedule generated at a higher update frequency than the microgrid long-term schedule to compensate for forecast uncertainties.

11. The system of claim 10, wherein the VPP controller generates a microgrid controller scheduler model for each microgrid connected to the VPP controller and each microgrid controller scheduler model is downloaded from the VPP controller to a respective microgrid controller.

12. The system of claim 10, wherein the microgrid long-term schedule generated by each microgrid scheduler for controlling energy flows comprises:

generating a long-term battery energy storage system charge/discharge schedule;

generating a long-term load dispatch schedule; and generating a long-term controllable generation schedule.

13. The system of claim 10, wherein the system further includes a forecast uncertainty estimator running in the microgrid long-term day(s) ahead scheduler that estimates a measure of uncertainty from microgrid long-term forecasts.

14. The system of claim 13, wherein the forecast uncertainty estimator estimates the uncertainties in the microgrid long-term forecasts to correct the microgrid long-term schedule for the effects of uncertainties in the microgrid long-term forecasts including at least:

power generated from renewable generators;

the battery energy storage system state of charge;

response times of the power generated by the renewable generators and the battery energy storage system; and manually entered long-term schedules.

15. The system of claim 14, wherein the system further comprises:

a first mixed integer non-linear programing MINLP solver connected to a historian, wherein the first MINLP solver is arranged to develop a schedule; and a second MINLP solver associated with the long-term day(s)-ahead scheduler and connected to the forecast uncertainty estimator, wherein the microgrid long-term schedule is generated using the uncertainty estimates for the microgrid long-term forecasts.

16. The system of claim 15, wherein a scheduler performance analyzer receives the schedule from the first MINLP solver and uses the microgrid short-term near real-time schedule with actual and ideal cost revenue inputs to generate a value that is a function of a difference between the total cost associated with an actual short-term near real-time schedule generated by the microgrid short-term near real-time scheduler and the schedule generated by the first MINLP solver.

17. The system of claim 16, wherein the microgrid short-term near real-time scheduler includes a recurrent neural network (RNN) that receives as an input the value generated by the scheduler performance analyzer to continuously improve the microgrid scheduler.

18. The system of claim 17, wherein each microgrid scheduler downloads an improved microgrid short-term near real-time scheduler to each microgrid controller associated with the microgrid scheduler, wherein the microgrid controller uses the microgrid controller scheduler model to generate a microgrid short-term near real-time schedule to control the energy flows between the electrical grid and the microgrids for storing energy in the microgrid battery energy storage system and for dispatching energy from the microgrid battery energy storage system to the electrical grid and microgrid.

* * * * *